United States Patent

[11] 3,560,640

[72] Inventor Robert K. Waring, Wilmington, Del.
[21] Appl. No. 696,754
[22] Filed Jan. 10, 1968
[45] Patented Feb. 2, 1971
[73] Assignee E. I. du Pont de Nemours and Company Wilmington, Del. a corporation of Delaware

[54] MAGNETIC RECORDING SYSTEM HAVING GRAY SCALE REPRODUCTION
15 Claims, 9 Drawing Figs.

[52] U.S. Cl. .......... 178/6.6, 340/174.1; 350/151
[51] Int. Cl. .......... H04n 3/10, G11b 11/10, G02f 1/18
[50] Field of Search .......... 340/174 Optus; 178/6.6A; 340/174.1MO; 350/151

[56] References Cited

UNITED STATES PATENTS

| | | | |
|---|---|---|---|
| 3,196,206 | 7/1965 | Griffiths .......... | 340/174.1 |
| 3,448,211 | 6/1969 | Haynes et al. .......... | 350/151 |
| 3,422,269 | 1/1969 | Dichen .......... | 350/151 |

*Primary Examiner*—Bernard Konick
*Assistant Examiner*—Steven B. Pokotilow
*Attorney*—Woodcock, Washburn, Kurtz & Mackiewicz

ABSTRACT: A magneto-optic reproducing system is disclosed in which primary magnetic images recorded on a recording medium are reproduced with a gray scale corresponding with the tone of the original. In such a system, a periodic magnetic field is applied to a receptor member at the same time that the local surface fields of the magnetic record are applied to the receptor member. The periodic magnetic field may be either spatially periodic or a time varying periodic field. An intermediate magnetic member is disposed between the recording medium and the receptor member to apply a magnetic field to the receptor member. This assists in providing good gray scale reproduction.

MAGNETIC RECORDING SYSTEM HAVING GRAY SCALE REPRODUCTION

BACKGROUND OF THE INVENTION

Magneto-optic reproducing systems have been proposed. Examples of such systems are shown in the U.S. Pats. to Baaba et al., No. 3,229,273; Kornei, No. 3,284,785; and Kelner et al., No. 3,167,751. In such systems, and image recorded on magnetic tape is reproduced by polarized light reflected from or transmitted through a receptor member whose magnetization is effected by the local surface field of the magnetic tape. The images may be reproduced from a moving recording medium by applying bursts of magnetic field to the receptor member for framing, as explained in my copending application Ser. No. 688,608, filed Dec. 6, 1967, now abandoned in favor of C.I.P. application Ser. No. 777,546 filed Nov. 8, 1968.

In such systems, there is a problem in reproducing tones in the final image. Such a reproduction of tone continuously from black to white is usually referred to as a gray scale. Reproduction of an image with gray scale is particularly difficult in magneto-optic reproducing systems because the magnetic receptor member is generally constructed of a magnetic material which exhibits binary characteristics. That is, the receptor member is sensitive only to the direction, not the magnitide, of the applied local surface magnetic field. Therefore, even though the applied local surface magnetic field may vary smoothly between its limits, the magnetization of each discrete area of the receptor member will be in one direction or the other.

SUMMARY OF THE INVENTION

This invention relates to methods of and a system for providing gray scale reproduction in magneto-optic reproducing systems.

In accordance with one embodiment of the invention, the problem of the receptor member exhibiting binary characteristics is overcome by magnetizing the receptor member in the sum of an applied periodic magnetic field and a local surface magnetic field derived from the primary image on the recording medium. This produces alternate magnetization of the receptor member which, in the absence of the local surface magnetic field, produces a gray tone in the displayed image. In the presence of the local surface magnetic field, a gray scale is produced in the displayed image related to the tone of the original image. In accordance with this invention, an intermediate member is positioned in proximity to the receptor member to apply a magnetic field to the receptor member.

In one particular aspect of the invention, the periodic magnetic field is a spatially periodic field which is generated by the intermediate member. The intermediate member is a high coercivity magnetic layer adjacent the receptor member. This layer is permanently magnetized with a periodic magnetic pattern. The spatial period or wavelength of the resultant spatially periodic field is less than the desired resolution increment of the image to be reproduced.

The magnetic receptor member has what is commonly referred to as an easy axis of magnetization; that is, it is normally magnetized in one of the two directions along this axis. In the absence of the local surface field from the recording medium, the spatially periodic field creates alternate magnetization areas of equal width in the two easy directions of magnetization of the receptor member. This produces an image which appears to be gray; that is, the tone is a the average of equal areas, one of which appears white and the other black. However, when the local surface fields of the recording medium are superposed upon this field, the balance of black and white is locally shifted corresponding to the amplitude and direction of the local field, thus increasing or decreasing the relative proportions of black and white. The image reproduced by the detector exhibits a gray scale based on the same principle as the halftone pictures known in the printing art.

As an alternative, the applied periodic field may be a time varying field, as contrasted to the spatially periodic field discussed above. The amplitude of the time varying field is adjusted to equal the sum of the coercivity of the receptor member and the largest local surface field. The time period of the applied field is less than the response time of the detector, which may be, for example, the eye. In regions of zero local surface field, a medium gray image will be reproduced. Where a local surface field is present, the receptor member will be driven to the state corresponding to the direction of the applied local surface field for a greater time. Accordingly, the zero field gray will be appropriately darkened or lightened to a degree proportional to the intensity of the local surface magnetic field.

The intermediate member of this particular embodiment of the invention serves as a transfer medium between the recording medium and the receptor member. This embodiment is referred to as time averaging. In this embodiment, an image is transferred from the recording medium to the intermediate member by framing bursts. The field of the image transferred to the intermediate member and the time varying field produce an image having a gray scale related to the tone of the original image.

In one embodiment, the time varying field has a triangular wave shape which produces a linear relationship between the local surface field and the tone of the reproduced image.

DESCRIPTION OF A PARTICULAR EMBODIMENT

Figures 1, 1A, 1B, 2:
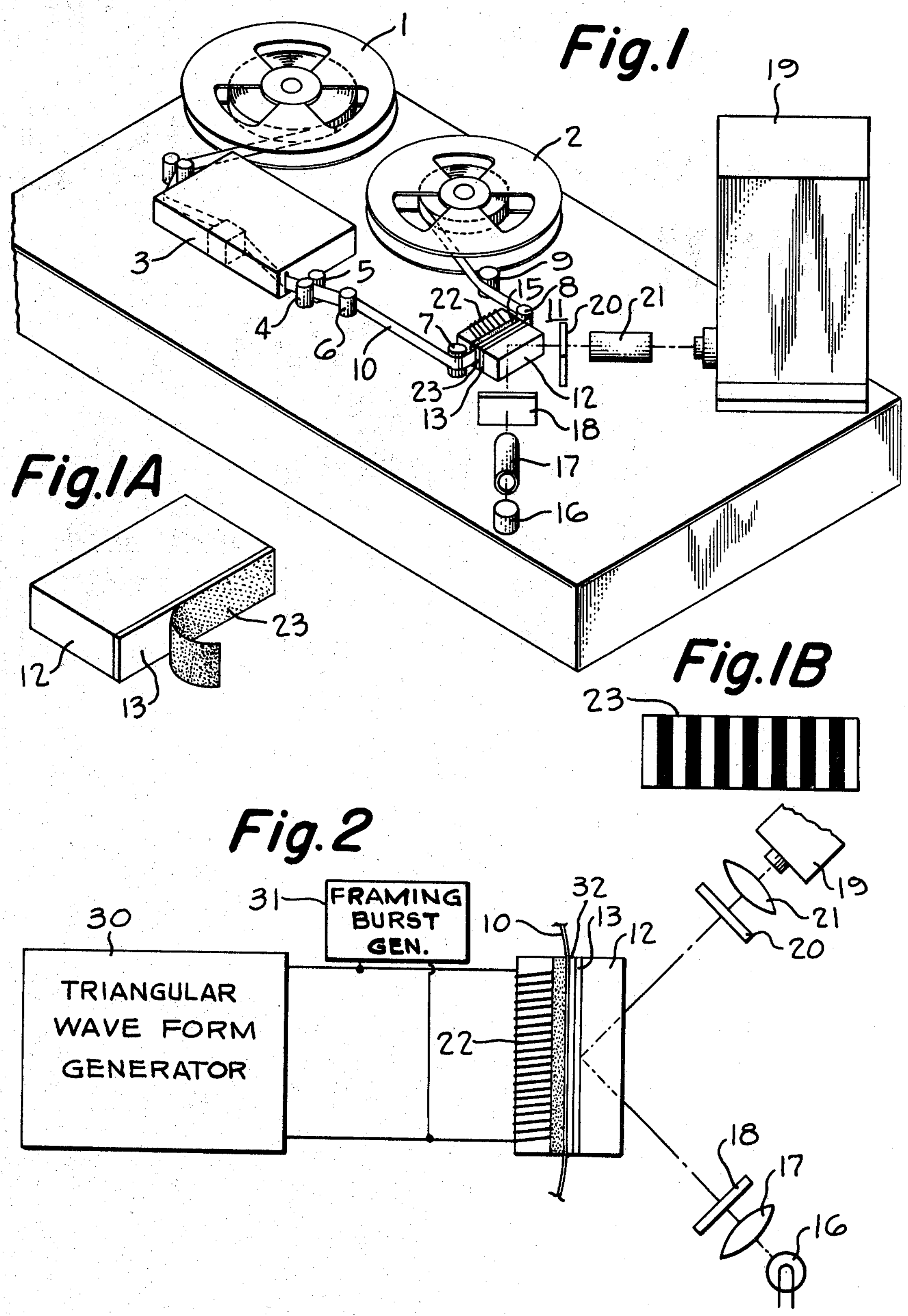
FIG. 1 shows a complete reproducing system in accordance with this invention.
FIG. 1*a* shows the details of the receptor member.
FIG. 1*b* shows the pattern of magnetization of the intermediate member.
FIG. 2 shows another modification of the invention.

Referring to FIG. 1, there is shown a conventional tape transport for moving a magnetic tape from a supply reel 1 to a takeup reel 2. The tape transport includes playback head 3 which is used to detect triggering signals, as will be subsequently explained.

The tape transport also includes a drive capstan 4, a pinchwheel 5, and a guide pin 6. Guide pins 7, 8 and 9 have been added to guide the moving magnetic tape 10 past the receptor member 11. The receptor member 11 includes an optically active surface 13 laid down on a rigid transparent substrate 12. Typically, the surface may be a ferromagnetic thin film such as a nickel-colbalt alloy. Surface 13 may include additional layers to enhance optical rotation.

The receptor member 11 is positioned in close proximity to the tape so that the local surface magnetic field of each primary image on the tape is applied to the receptor member 11. In order to do this, a pressure pad 15 holds the tape in intimate contact with the receptor member 11.

In order to display each secondary image, plane polarized light is incident upon the receptor member 11 in an area substantially equal to the area of each primary image. A relatively small size powerful source of light 16 emits a beam of light. The size of the source must be small, as close to a point source as possible, so that the collimator lens 17 will produce an optimally parallel beam which is applied to the polarizer 18. The plane polarized light from polarizer 18 is incident upon the receptor member 11. The angle of incidence shown in the drawings is not necessarily the correct angle, but this angle can be adjusted by a person of ordinary skill in accordance with the material of the substrate 12 and the reflecting characteristic of the optically active surface 13. Examples of components which are suitable for use to produce the plane polarized light beam are:

light source 16—G.E. lamp type CM1630 collimator lens 17—18 mm. diameter, focal length 30 mm.

polarizer 18—Polaroid * HN22 film.

The receptor member 11 is illuminated with collimated plane polarized light. This light is reflected to form a visible image of the optically active surface 13 which is projected onto an image detector 19. The reflected light is modulated by the magneto-optic effect of the surface 13 on the incident light. In the particular example described, the longitudinal Kerr magneto-optic effect has been utilized. In making use of the longitudinal Kerr effect, the plane of incidence of the illuminating light always contains the easy axis of magnetization of the optically active surface.

The visible image is formed by light which has passed through the analyzer 20 and image forming lens 21. The image forming lens 21 should be adjusted so that the image of the optically active surface is applied to the active element of the image detector 19. Image detector 19 may be an image orthicon tube, vidicon tube, or apparatus for forming a photographic image of the visible image formed by the image forming lens 21. Alternatively, image forming lens 21 can be adjusted to form an image which can be viewed with the human eye.

The polarizer 18 produces polarized light which has a plane of polarization which is either transverse to or parallel to the plane of incidence. The angle of the plane of polarization of the reflected light is rotated, by the Kerr effect, with respect to the angle of the plane of polarization of the incident light. The direction of rotation will depend upon the polarity of magnetization. For example, if a region of the surface 13 is magnetized to positive saturation, the light reflected from that region will have its plane of polarization rotated a given amount in one direction with respect to the plane of polarization of the incident light. If a region is magnetized to negative saturation, then the light reflected from that region will be shifted by the given amount in the other direction with respect to the plane of polarization of incident light.

For optimum contrast in the image, the analyzer 20 is oriented so that light reflected from the region of the surface 13, which has been magnetically saturated in one direction, displays maximum contrast with light that has been reflected from a region which has been magnetically saturated in the other direction. The analyzer 20 may be, for example, a disc of Polaroid * HN22 film.

In order to intermittently apply a burst of magnetic field to the receptor member 11, biasing means, including the framing coil 22, have been provided. The bursts of the magnetic field must be applied specifically to the optically active surface 13. In this specification, where reference is made to applying the magnetic field to the receptor member, it will be understood that it is meant that the magnetic field is applied specifically to the surface 13.

The coil 22 is intermittently energized in response to trigger signals impressed at appropriate positions on the magnetic tape. The trigger signals accurately identify the position of each magnetic primary image recorded on the tape. The playback head 3 detects the trigger signals which occur when the primary image on the magnetic tape is in the desired position relative to the receptor member 11. Generally, it is advantageous to place the playback head 3 as close to the surface 13 as possible.

What has been thus far described with reference to the FIGS. is not directly concerned with the present invention but, rather, is a description of a system to which the present invention is applicable. The framing technique of applying bursts of magnetic field to the receptor member is the invention claimed and described in my copending application referred to above.

In this embodiment of the invention, the intermediate member is a high coercivity magnetic layer 23. The layer 23 is magnetized in a periodic pattern which is shown in FIG. 1*b*. The pattern consists of alternate magnetization areas, indicated by the black shading. The intensity of magnetization as between the dark areas and the white areas in FIG. 1*b* is such that the local surface magnetic field is triangular in waveform as will be later described in more detail with regard to FIG. 3*a*. It should be noted that the magnetization is not necessarily uniform within the dark areas and white areas as may be indicated by the consistent shading in FIG. 1*b*. Rather, the magnetization will vary within the alternate areas in such a manner as to obtain the triangular waveform of the spatially periodic field.

The layer 23 must be thinner than the image resolution increment or resolution will be lost. For example, the layer 23 may be approximately .0005 inches for a 1 mil resolution increment. A thin protective surface may be coated over the intermediate layer to prevent movement of the tape from wearing the thin film. The protective layer may be separate from the layer 23 or the two layers may be combined in one layer. Depending on the optical properties of the magnetic elements involved, it may be necessary to interpose a dielectric layer between the protective surface and the ferromagnetic film to achieve optical isolation.

The direction of a magnetization of the layer 23 is aligned with the easy axis of magnetization of the receptor member 11 in one embodiment, although other alignments may be used.

The spatially periodic field produced by the layer 23 varies along one direction in the plane of the receptor member to produce line halftoning. However, dot halftoning can also be produced by a periodic magnetic field varying in two dimensions in the receptor member. While the field must be parallel to the easy axis of magnetization, the periodic variation in the field may be along any axis or may be along more than one axis.

Figure 3A:
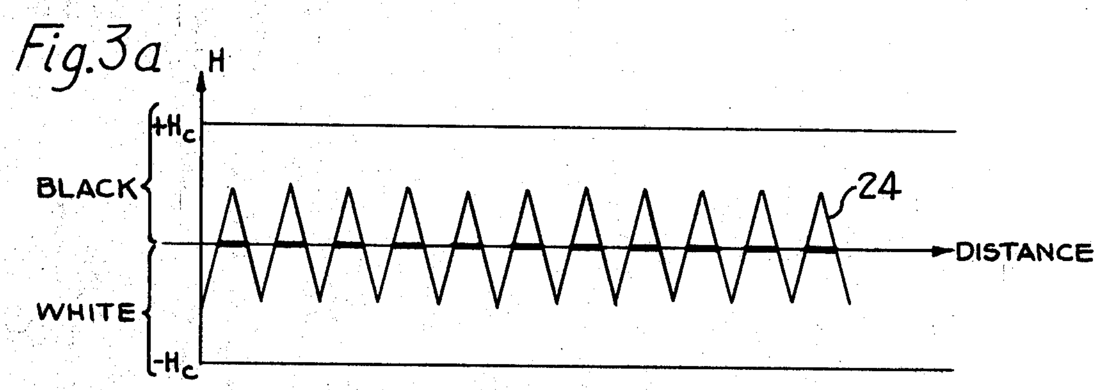
FIGS. 3*a* and 3*b* are waveforms depicting the operation of the invention with an applied spatially periodic field.
Figure 3B:
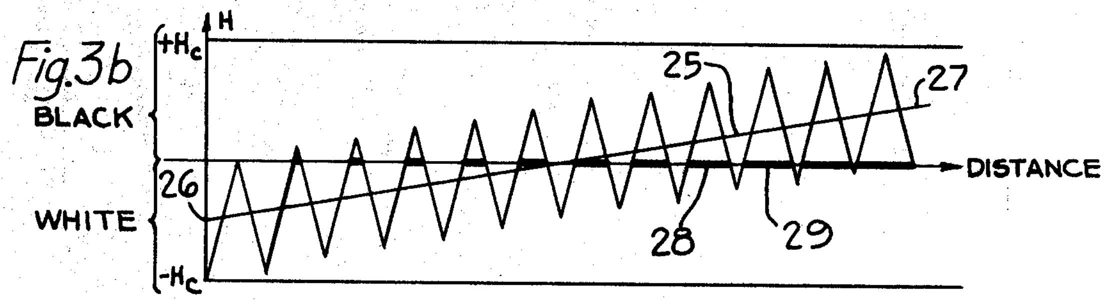

The operation of this embodiment of the invention can best be understood with reference to the waveforms of FIGS. 3*a* and 3*b*. In FIG. 3*a*, the triangular waveform 24 depicts the spatially periodic field produced by the layer 23. Note that the amplitude of this field is below the coercivity $H_c$ of the receptor member. FIG. 3*a* shows a spatial pattern of magnetization along the abscissa.

The local surface magnetic field of the primary image recorded on the tape is depicted by the slanting line 25 in FIG. 3*b*. The local surface magnetic field has been shown as changing from one extreme to the other across the distance depicted in FIG. 3*b*. That is, at the point 26, the local surface field represents one extreme; for example, complete white in the image, whereas at 27 the local surface field represents the other extreme, complete black in the image. Between the points 26 and 27 the image has a tone which varies linearly between the two extremes. Upon anhysteretic magnetization of the receptor member in the sum of the applied local surface magnetic field and the spatially periodic field, those areas in which the sum is positive will be magnetized in one direction and those areas in which the sum is negative will be magnetized in the other direction.

On the baseline of FIG. 3*b*, there has been shown a number of darkened segments 28, 29, and others not given reference numerals. These darkened segments indicate the segments of the receptor member in which the sum of the spatially periodic field and the applied local surface field exceeds a predetermined level; in this case, zero.

In order to convert this summed field into a magnetization of the receptor member, a burst of magnetic field is applied by the coil 22. As more fully explained in the copending application previously mentioned, this burst of magnetic field is used for framing. One example of such a framing burst is the application of a decaying oscillating field. The burst initially has an amplitude which exceeds the coercivity of the receptor member, $+H_c$. The burst decays to a lesser value which commonly will be zero. The receptor member is anhysteretically magnetized in the sum of the spatially periodic field and the local surface field. Where the sum of the spatially periodic field and the applied local surface field is positive, the receptor member 11 will be magnetized in one direction; where the sum is negative, the receptor member 11 will be magnetized in the other direction. A more complete description of anhysteretic magnetization is contained in the THE PHYSICS OF MAGNETIC RECORDING, C.D. Mee, Interscience Publishers, New York, 1964, Chapter 2, pages 24—26.

As more fully explained in my copending application referred to previously, framing techniques other than anhysteretic framing may be used. For example, a unidirectional magnetization pulse applied transversely to the easy axis of the receptor member may be used to fix the image in the receptor member.

In this case, the bursts have an amplitude which diminishes from a value substantially larger than the anisotropy field of the receptor member to a substantially zero value. The surface field of the primary image is aligned with the easy axis of magnetization of the receptor member so that upon collapse of the transverse magnetic field, the magnetization of the receptor member is aligned with the surface field of contiguous areas of the recording medium. Also, the magnetization of the tape may be oriented in several ways. The magnetization may be parallel with the direction of motion of the tape, transverse to the direction of motion in the plane of the tape, or transverse to the plane of the tape. However, in all cases, the easy axis of magnetization of the receptor member will be parallel to the magnetization of the tape. FIG. 3*b* shows one possible variation in field amplitude.

Other means may be used to apply the spatially periodic field. For example, a pattern of current conductors may be used as the intermediate member. In conjunction with FIG. 1, the intermittent bursts of magnetic field are used for framing as well as for transfer of the image. In this embodiment of the invention, the essential function of the framing bursts is for transfer of images. This transfer may be from a stationary recording medium or from a moving recording medium.

MODIFICATIONS OF THE INVENTION

The embodiment of FIG. 2 has particular utility where the image is transferred from a moving recording medium. In this embodiment, the applied periodic magnetic field is a time varying field. The time varying field is generated by the triangular waveform generator 30.

As shown in FIG. 2, the triangular waveform is applied to the framing coil 22. Framing burst generator 31 applies framing bursts to the same coil. Some modifications require two separate coils. One coil applies the framing bursts in a direction transverse to the easy axis of magnetization of the receptor member. The other coil applies the triangular field in a direction parallel to the easy axis of the magnetization of the receptor member.

In this embodiment of the invention, the intermediate magnetic member is a transfer medium, or member, 32. The member 32 is necessary when there is a transfer of an image from a moving tape. In this case, the framing bursts fix the image in the member 32. The field of the image is then applied to the receptor member to produce an image in the receptor member. The time varying applied field modifies this image to produce the gray scale in the final displayed image.

Figures 4A, 4B:
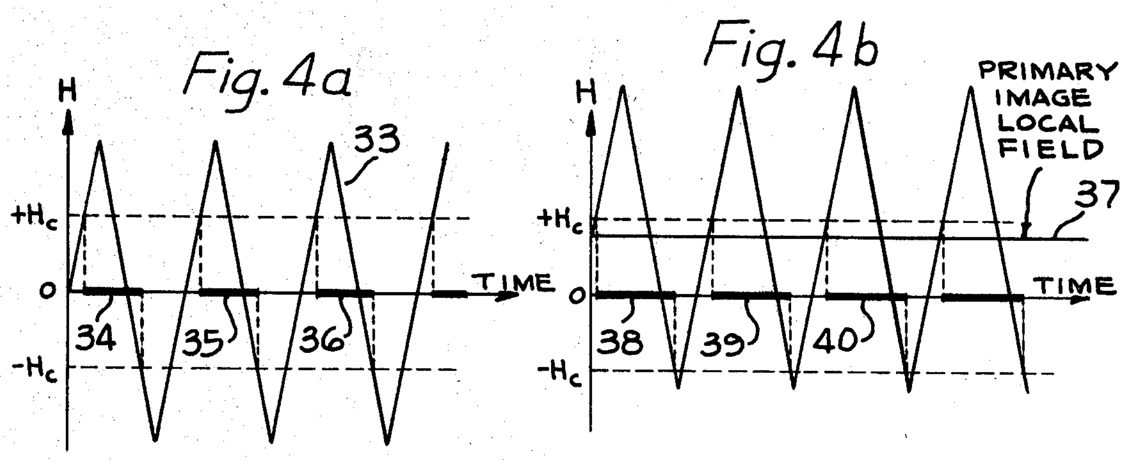
FIGS. 4*a*—4*c* are waveforms depicting the operation with an applied time varying field.
Figure 4C:
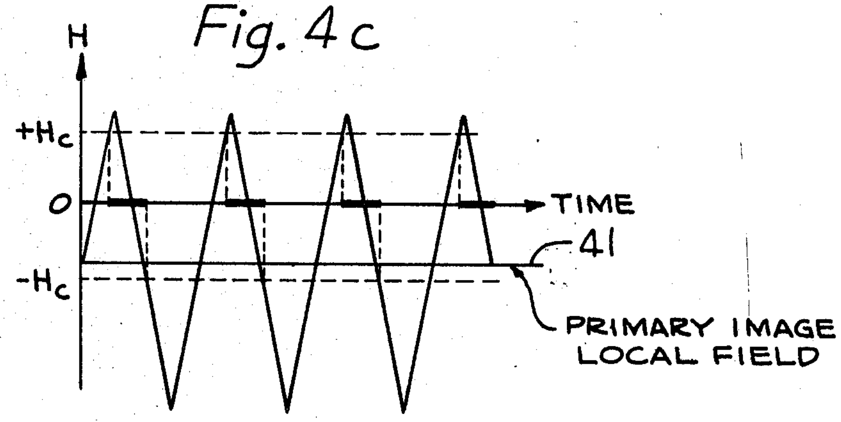

The operation of the embodiment of FIG. 2 using the time varying magnetic field may be best understood with reference to FIGS. 4*a*, 4*b* and 4*c*. In these FIGS., time is the abscissa, and the amplitude of the magnetic field applied to the receptor member is the ordinate. In FIG. 4*a*, the reference numeral 33 indicates the triangular waveform of the applied periodic field. The amplitude of the applied time varying field is adjusted to equal the sum of the coercivity of the receptor member, $H_c$, and the largest field produced by the intermediate member. The period of the time varying field is less than the time resolution of the eye or of the detecting means used in the system.

FIG. 4*a* depicts the condition in which the applied local surface field is zero. In this case, the receptor member is alternately magnetized in one direction and then in another direction for equal periods of time. The time periods in which the receptor member is magnetized in a direction corresponding with a positive applied magnetic field are indicated by the shaded segments 34, 35, 36, and so on. It will be noted that the receptor member is magnetized in this direction when the applied field exceeds $+H_c$ and the magnetization is not reversed until the applied field exceeds $-H_c$. In the regions in which a zero local surface field is present, as depicted in FIG. 4*a*, the resultant image will have a medium gray tone.

FIG. 4*b* represents the magnetization of a portion of the receptor member to which a positive local surface field is applied. The line 37 represents the level of the local surface field. The relatively long segments 38, 39 and 40 indicate that this portion of the receptor member is magnetized in the direction corresponding with a positive applied field most of the time. This produces a dark gray area in the resultant image.

FIG. 4*c* is a similar representation for a negative local surface field indicated by the line 41. In this case, the corresponding area of the resultant image is light gray.

In the specific embodiments which have been described, triangular waveforms have been shown. The waveforms of FIGS. 3*a*, 3*b*, and 4*a*—4*c* may be adjusted to a nontriangular waveform which will optimize the transfer function that relates the original image to the displayed image.

The recording of the images on the recording medium can be carried out in accordance with several well-known techniques, but the technique described in the Nacci applications, Ser. No. 409,885, filed Nov. 9, 1964 now abandoned and Ser. No. 636,729 filed May 8, 1967 now abandoned in favor of application Ser. No. 779,393 filed Nov. 27, 1968, is particularly suitable. The recording medium is uniformly premagnetized. Light is projected through a continuous tone transparency of the original image onto the recording medium so that selective heating of the recording medium above the Curie temperature is obtained. The change in magnetization in any area on the recording medium is related to the intensity of light incident on that area. This produces a magnetic record having a magnetization which varies between magnetization and demagnetization in relation to the tone of the original image.

In some modifications, it may be desirable to reproduce an image from a stationary recording medium. In this case, the framing burst may be omitted. The primary image on the recording medium is placed into magnetic contact with the receptor member in such a way that the local surface field of the recording medium is aligned with the easy axis of magnetization of the receptor member. The local surface magnetic fields must have a strength which exceeds the coercivity of the receptor member so that the receptor member is directly magnetized in conformance with the primary image on the recording medium and modified by the time or spatially periodic field to produce appropriate gray tone.

The system which has been described can be used without modification where it is desired to produce a final image in which the tone varies linearly with the local surface field of the primary image. Similarly, it can be used to produce a gray scale in the displayed image which is related to the tone of the original image, but not necessarily in a one-to-one relationship. The reason for this is that the magnetization of the recording medium is linearly related to the tone of the original image, but the local surface magnetic field is not necessarily linearly related to the magnetization. Approximate compensation can be made for this by performing the appropriate inverse operation on the output of the detection system.

While particular embodiments of the invention have been shown and described, it will be understood that various modifications may be made without departing from the principles of the invention. The appended claims are, therefore, intended to cover any such modifications within the true spirit and scope of the invention.

I claim:

1. Apparatus for converting primary images recorded on a recording medium to a displayed image having a gray scale related to the tone of the original image comprising:

a receptor member positioned for transfer of said primary images from said recording medium to said receptor member;

optical means for directing light onto said receptor member to obtain the passage from said receptor member of light having characteristics in accordance with the image transferred from said recording medium;

means for detecting images formed by light from said receptor member; and an intermediate magnetic member positioned to apply a magnetic field to said receptor member, said receptor member being magnetized in the sum of an applied periodic magnetic field and a magnetic field derived from said primary image to produce alternating magnetization of said receptor member which in the presence of the derived magnetic field produces a gray scale in said displayed image related to the tone of the original image.

2. The apparatus recited in claim 1 wherein said intermediate member is a high coercivity magnetic member magnetized in a periodic pattern of alternate magnetization areas which applies to said receptor member a spatially periodic magnetic field having a spatial period less than the desired resolution increment of the image to be reproduced.

3. The apparatus recited in claim 1 further including means for applying a time varying field to said receptor member, said time varying field having a time period less than the desired time resolution of the system.

4. The apparatus recited in claim 1 further including:

means for applying a time varying field to said receptor member, said time varying field having a time period less than the desired response time of the system;

means for moving said recording medium relative to said receptor member; and means operative in accordance with the movement of the medium for intermittently applying bursts of magnetic field to said intermediate member to transfer said primary image to said intermediate member, the field of the image transferred to the intermediate member and said time varying field producing in said receptor member an image having a gray scale related to the tone of the original image.

5. The apparatus recited in claim 1 further comprises means for applying a space-varying field to said receptor member, said space-varying field having a space period less than the desired space resolution of the system.

6. Apparatus for converting primary images to a displayed image having a gray scale related to the tone of the original image comprising:

a magnetic recording medium having said primary image recorded thereon;

a receptor member positioned for transfer of said primary images from said recording medium to said receptor member;

means for illuminating said receptor member to obtain passage from said receptor member of light having characteristics in accordance with the image transferred from said recording medium;

means for detecting images formed by light from said receptor member; and means for applying a spatially periodic magnetic field to said receptor member to produce in said receptor member the sum of the field from said recording medium and said spatially periodic field to reproduce an image having a gray scale related to the tone of the original image.

7. Apparatus for converting primary images recorded on a recording medium to a displayed image having a gray scale related to the tone of the original image comprising:

a receptor member positioned for transfer of said primary images from said recording medium to said receptor member;

means for illuminating said receptor member to obtain passage from said receptor member of light having characteristics in accordance with the image transferred from said recording medium;

means for detecting images formed by light from said receptor member;

means for applying a spatially periodic magnetic field to said receptor member to produce in said receptor member an image having a gray scale related to the tone of the original image;

means for moving said recording medium relative to said receptor member; and means operative in accordance with the movement of the medium for intermittently applying bursts of magnetic field to said receptor member to transfer said primary image to said receptor member.

8. Apparatus for converting primary images recorded on a recording medium to a displayed image having a gray scale related to the tone of the original image comprising:

a receptor member positioned for transfer of said primary images from said recording medium to said receptor member;

optical means for directing light onto said receptor member to obtain passage from said receptor member of light having characteristics in accordance with the image transferred from said recording medium;

means for detecting images formed by light from said receptor member;

an intermediate member positioned between said recording medium and said receptor member;

means for applying a time varying field to said receptor member, said time varying field having a time period less than the desired time resolution of the system;

means for moving said recording medium relative to said receptor member; and means operative in accordance with the movement of the medium for intermittently applying bursts of magnetic field to said intermediate member to transfer said primary image to said intermediate member, the field of the image transferred to the intermediate member and said time varying field producing in said receptor member an image having a gray scale related to the tone of the original image.

9. The method of converting primary images recorded on a magnetic recording medium to displayed images having gray scale reproduction comprising:

moving said recording medium into proximity with a magnetic receptor member so that the primary image field of the primary record acts on said receptor member;

applying light to said receptor member;

displaying images formed by light from said receptor member and modulated by the magneto-optic effect of the secondary magnetic image produced in said receptor member; and applying a spatially periodic field to said receptor member, the period of said spatially periodic field being less than the desired resolution increment of the gray scale reproduction, said magnetic receptor member being magnetized in the sum of said applied spatially periodic magnetic field and a magnetic field derived from said primary image to produce alternate magnetization of said receptor member which, in the absence of said derived magnetic field, produces a gray tone in the displayed image and which, in the presence of said derived magnetic field produces a gray scale in said displayed image related to the tone of the original image from which the primary image was made.

10. The method recited in claim 9 wherein an original image is recorded on said recording medium by magnetizing said recording medium to produce a primary image on said recording medium having magnetization which varies continuously between two extremes in relation to the tone of the original image.

11. The method recited in claim 9 further including intermittently applying bursts of magnetic field to said receptor member when said primary record is in the desired position relative to said receptor member so that said primary record is converted to a secondary magnetic image in said receptor member, said magnetic field being applied in the direction of the easy axis of magnetization of said receptor member, said bursts being an oscillating magnetic field having a field strength which is gradually reduced from a maximum level substantially producing magnetic saturation of said receptor member to a minimum level which is below the coercivity of the receptor member to produce anhysteretic remanent magnetization of said receptor member which is a function of the local surface magnetic field of each primary record.

12. The method recited in claim 9 wherein said magnetic receptor member has a coercivity substantially less than the surface field strength of said primary magnetic image and wherein the step of moving said recording medium into proximity with the magnetic receptor member includes placing the primary magnetic record on said recording medium into magnetic contact with said magnetic receptor member to align the surface field of said recording medium with the easy axis of magnetization of said magnetic receptor members to directly magnetize said magnetic receptor member in conformance with said primary magnetic image on said recording medium.

13. The method of converting primary images recorded on a magnetic recording medium to displayed images having gray scale reproduction comprising:

moving said recording medium into proximity with an intermediate member so that the primary image field of the primary record acts on said intermediate member;

intermittently applying bursts of magnetic field to said intermediate member to transfer said primary image to said intermediate member, said intermediate member being in magnetic coupling relationship with a receptor member;

applying a time varying field to said receptor member, said time varying field having a time period less than the desired time resolution of the system;

the field of the image transferred to the intermediate member being summed with said time varying field to produce in said receptor member an image having a gray scale related to the tone of the original image.

applying light to said receptor member; and displaying images formed by light from said receptor member and modulated by the magneto-optic effect of the magnetic image produced in said receptor member

14. The method recited in claim 13 wherein an original image is recorded on said recording medium by magnetizing said recording medium to produce a primary image on said recording medium having magnetization which varies continuously between two extremes in relation to the tone of the original image.

15. The method of storing a visible image on a magnetic recording medium and converting the stored image to a displayed image having gray scale reproduction comprising:

uniformly premagnetizing said recording medium;

projecting light through a continuous tone transparency of said visible image onto said recording medium so that the change in magnetization in any area on said recording medium is related to the intensity of light falling on that area to produce a primary magnetic record having a magnetization which varies continuously between two extremes in relation to the tone of said visible image;

moving said recording medium into magnetic coupling relationship with a magnetic receptor member so that the primary image field of said primary record produces a secondary magnetic image in said receptor member;

applying light to said receptor member;

displaying images formed by light reflected from said receptor member and modulated by the magneto-optic effect of said secondary magnetic image; and magnetizing said magnetic receptor member in the sum of an applied periodic magnetic field and a magnetic field derived from said primary image to produce alternate magnetization of said receptor member which, in the absence of said derived magnetic field, produces a gray tone in the displayed image and which, in the presence of said derived magnetic field, produces a gray scale in said displayed image related to the tone of said visible image.